United States Patent
Goodman

(10) Patent No.: US 10,416,185 B2
(45) Date of Patent: Sep. 17, 2019

(54) ACCELEROMETER WITH BUILT-IN TEMPERATURE CORRECTION

(71) Applicant: William Goodman, Sunnyvale, CA (US)

(72) Inventor: William Goodman, Sunnyvale, CA (US)

(73) Assignee: Applied Physics Systems, Mountain View, CA (US)

( * ) Notice: Subject to any disclaimer, the term of this patent is extended or adjusted under 35 U.S.C. 154(b) by 247 days.

(21) Appl. No.: 15/222,696

(22) Filed: Jul. 28, 2016

(65) Prior Publication Data

US 2018/0031593 A1    Feb. 1, 2018

(51) Int. Cl.
| | |
|---|---|
| *G01P 15/13* | (2006.01) |
| *G01P 1/00* | (2006.01) |
| *G01P 15/125* | (2006.01) |
| *G01P 15/08* | (2006.01) |
| *B23K 26/0622* | (2014.01) |

(52) U.S. Cl.
CPC .......... *G01P 1/006* (2013.01); *G01P 15/0802* (2013.01); *G01P 15/125* (2013.01); *G01P 15/132* (2013.01); *B23K 26/0624* (2015.10)

(58) Field of Classification Search
CPC ....................................... G01P 1/006
USPC ....................................... 73/1.39
See application file for complete search history.

(56) References Cited

U.S. PATENT DOCUMENTS

| | | | |
|---|---|---|---|
| 3,702,073 A | 11/1972 | Jacobs | |
| 4,779,461 A * | 10/1988 | Gilman | G01C 5/06 73/384 |
| 5,182,949 A | 2/1993 | Rupnick | |
| 5,203,210 A | 4/1993 | Terry | |
| 5,524,488 A | 6/1996 | Foote | |
| 6,032,531 A * | 3/2000 | Roszhart | G01C 19/56 73/504.04 |
| 6,758,080 B1 * | 7/2004 | Ragan | G01V 13/00 73/1.38 |
| 7,248,444 B1 * | 7/2007 | Lauer | G11B 5/102 360/244.4 |
| 2010/0192662 A1 | 8/2010 | Yanni | |
| 2015/0027779 A1 | 1/2015 | Sugiara | |
| 2017/0066464 A1 * | 3/2017 | Carter | B60T 7/12 |

* cited by examiner

*Primary Examiner* — Walter L Lindsay, Jr.
*Assistant Examiner* — Philipmarcus T Fadul
(74) *Attorney, Agent, or Firm* — Tran & Associates

(57) ABSTRACT

Systems and methods are disclosed for generating temperature compensated acceleration data in both analog and digital format from a torque balance accelerometer (TBA). During manufacture of the TBA, a calibration process is used consisting of cooling and heating the TBA to discrete temperatures within a range and at each discrete temperature measuring the TBA scale factor and offset. After collecting scale and offset data, said data is loaded into the memory of the TBA.

During field operation, sensing a current temperature, retrieving the closest scale and offset correction factors from memory of the TBA, and performing linear interpolation to generate a temperature-compensated output for the TBA.

18 Claims, 5 Drawing Sheets

ACCELEROMETER WITH BUILT-IN TEMPERATURE CORRECTION

This application is related to application entitled "LASER ABLATION OF ACCELEROMETER PROOF MASS" with Ser. No. 15/222,671, filed concurrently herewith, the content of which is incorporated-by-reference.

BACKGROUND

The present invention relates to a temperature compensated accelerometer.

Accelerometer sensors are used in a variety of applications. For instance they can be used to measure the change in velocity per unit time (accelerometer applications), the pull of gravity (tilt applications) and shock and vibration. In many application areas it is required that the accelerometer have a very high degree of accuracy over a wide temperature range. For instance accelerometers used in high end inertial guidance systems typically require an accuracy of one part in 1000 over a temperature range of −40 C to +85 C. A typical tilt application of accelerometers is their use in oil well drilling systems to measure the inclination and roll angle of the drill string as the well is being drilled. This application enables the well to be directionally drilled. In this case an acceleration accuracy of one part in 1000 must be maintained over a temperature range of −30 C to +175 C.

The preferred acceleration technology used to achieve high accuracy over a wide temperature range is the Torque Balance Accelerometer (TBA). This sensor consists of an amorphous quartz hinge supporting a quartz proof mass, a support structure, a permanent magnet torquer, a capacitive pick off and self-contained analog electronics. TBA's of the prior art typically produce a non temperature compensated analog output voltage proportional to the measured acceleration.

It is well known that the temperature stability of the TBA is high due in large part to the use of amorphous quartz as the material for the system proof mass and support hinge. However for very high accuracy applications the TBA offset and scale factor must be temperature compensated. The accelerometer has an internal temperature sensor and in the prior art this compensation is performed external to the accelerometer by reading the temperature and acceleration and modeling the offset and scale factor corrections. In the prior art this correction is performed by the end user of the accelerometer after the accelerometer is installed in the user equipment.

The current invention disclosure adds integral digital processing and memory capability to the TBA. This added capability enables the digital transmission of temperature calibrated accelerometer data. This capability also enables the analog output voltage of the accelerometer to be internally temperature calibrated through the use of a high accuracy digital to analog converter.

SUMMARY

Systems and methods are disclosed for generating temperature compensated analog and digital outputs from a torque balance accelerometer (TBA). During manufacturing of a TBA, the system performs factory calibration of the TBA and for each a plurality of temperature ranges, the calibration includes cooling and heating the TBA to a temperature, collecting scale and offset correction factors at the temperature and storing the scale and offset correction factors in a memory of the TBA. During field operation, sensing a current temperature, retrieving the closest scale and offset correction factors from memory of the TBA, and performing linear interpolation to generate a temperature-compensated output for the TBA. Other methodologies of temperature compensation may also be used (for instance use of a power series may be used to fit the compensation data).

Advantages of the system may include one or more of the following. The system enables the scale and offset calibration data to be measured at the factory and stored in the TBA internal memory. By adding an internal microprocessor and A to D system to the TBA electronics, the TBA can correct the accelerometer digital data output before transmission of the data. The temperature calibration of the TBA at the factory is lengthy in that it involves cooling and heating the system to various set temperatures e.g. −25, 0, 25, 50, 75, 100, 125, 150, 175 degrees Celsius and measuring a scale factor and offset at each temperature. By performing this process at the factory and downloading the calibration data to the TBA memory instead of temperature calibrating the TBA after it is installed in an external system, considerable time is saved by the user of the TBA. In addition performing an external calibration of the TBA requires considerable equipment and expertise. Internal calibration performed at the factory hence removes the burden of the difficult and time consuming calibration process from the TBA user.

DESCRIPTION

Figure 1:
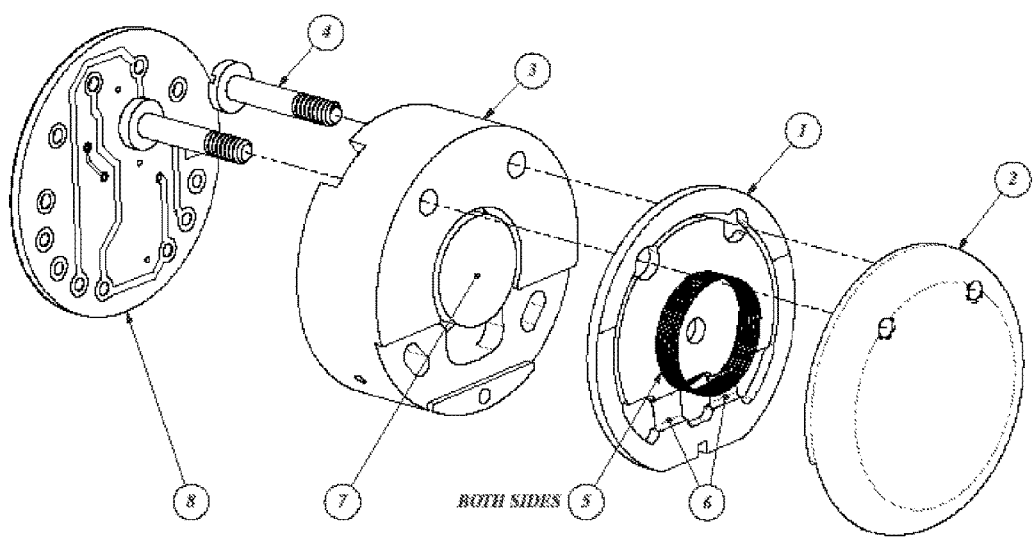
FIG. 1 shows an exploded view of an exemplary accelerometer with temperature compensation.
Figure 3:
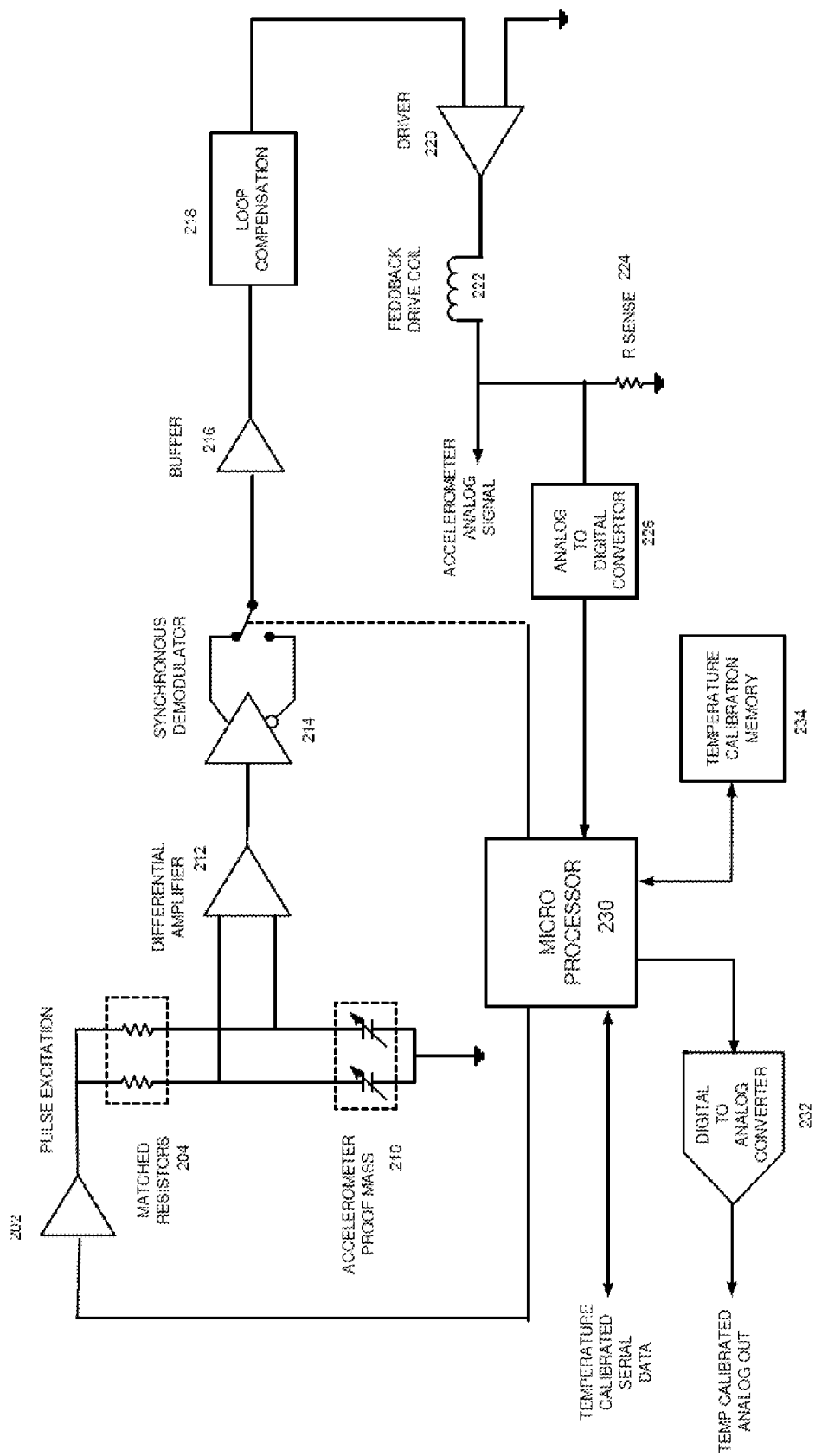
FIG. 3 shows another exemplary circuit with a temperature compensated accelerometer and support electronics.

FIG. 1 shows an exploded view of the inner assembly of an accelerometer with internal temperature compensation. For purposes of clarity the outer package of the accelerometer which typically consists of a metal can and header with electrical connections is not shown. The inner accelerometer assembly includes system electronics 8, an exemplary quartz proof mass 1 with support ring 9 and two support hinges 6, bottom pole piece 3, top pole piece 2 and torque feedback coil 5. In the completed assembly the two pole pieces and proof mass are clamped together by screws 4 as shown in FIG. 3. In one embodiment, the support hinges 6 are laser trimmed, as described in the co-pending Application entitled "LASER ABLATION OF ACCELEROMETER PROOF MASS." The proof mass 1 is positioned between first and second pole pieces 2 and 3 and is able to move a small amount either toward pole piece 2 or toward pole piece 3 due to application of an acceleration or a pull of gravity. This movement is possible because the proof mass support ring has a slightly increased thickness at the top semicircular end 7. The position of the proof mass is determined by measuring the capacitance between the top metalized surface of the proof mass and the bottom pole piece and between the bottom metalized surface of proof mass and the top pole piece. The bottom pole piece has a cylindrical permanent magnet 6 mounted within it. A feedback coil 5 is mounted to the proof mass and together with the magnetic field from the magnet produces a torque on the proof mass when energized with a current. The system electronics enables measurement of the two capacitances and equalization of them through application of current to the feedback coil thus continually centering the proof mass and balancing out applied accelerations.

Figure 2:
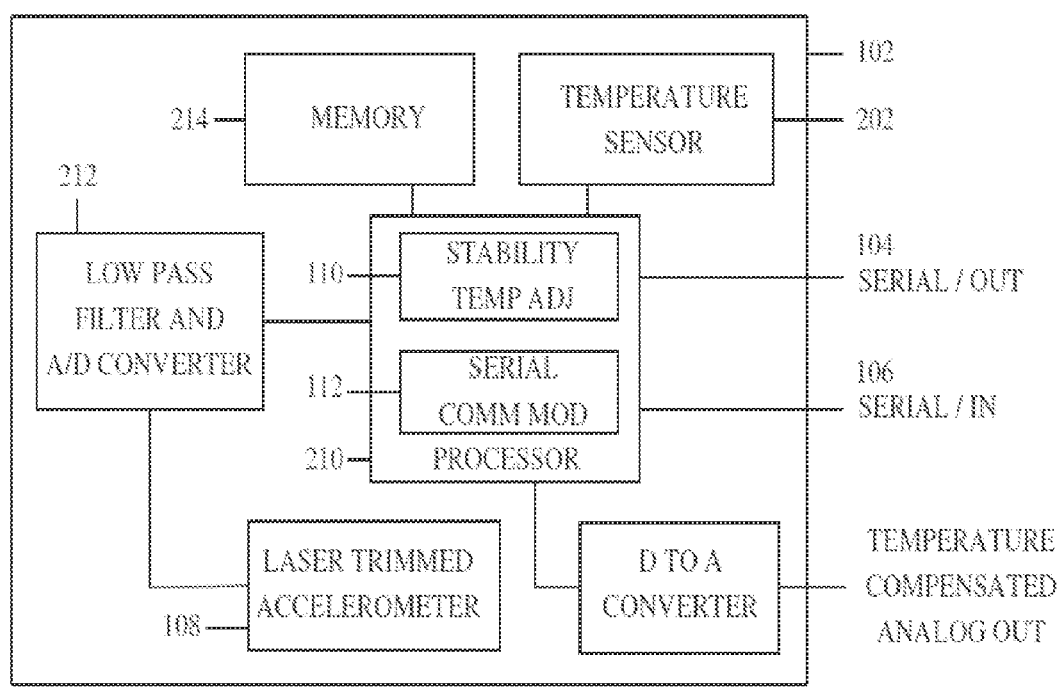
FIG. 2 shows an exemplary temperature compensated accelerometer controller.

FIG. 2 shows an exemplary temperature compensated accelerometer controller 102. The controller 102 measures the current in the feedback coil 5 of the TBA 108, and the output is suitably filtered and digitized with the low pass filer and A/D converter 212. The output of the A/D converter 212 is provided to a processor 210 in the controller 102. The controller 102 may also include a temperature sensor 202 connected to the processor 210 for determining temperature of the environment of the electronic device 102. It will be appreciated that the temperature sensor 202 may take many forms such as, for example, an electrical resistance thermometer which has a resistance which varies with temperature. The processor 210 runs a temperature adjustment module 110. In some embodiments, the processor 210 may utilize data stored in a memory 214 of the electronic device 102, such as a look-up table or formula, to determine a temperature correction factor to correct for bias factor and scale factor variations due to temperature in accordance with the measured temperature. That is, a temperature mapping may be used to determine a temperature compensation factor. Because temperature sensitivity may vary between accelerometers, the temperature mapping (e.g. the look-up table or formula) for a particular TBA may be constructed by measuring the accelerometer output over a range of temperatures in which the TBA is intended to operate. The temperature correction factor can then be used to adjust the accelerometer output during measurement to compensate for the temperature sensitivity. The temperature mapping (e.g. the look-up table or formula) data may be provided in a memory of the IC, such as EEPROM or flash memory. As shown in FIG. 2a, a digital to analog converter (D/A converter) can be driven by the processor 210 to provide analog output corresponding to acceleration. The processor 210 can run a serial communication module 112 that drives serial input/outputs 104/106 to communicate with an external processor reading for the acceleration data. The processor 210 may provide an industry standard interface such as an RS-232, SPI or I2C interface for connecting to an external electronic device.

FIG. 3 shows another exemplary circuit with a temperature compensated accelerometer and support electronics. In this embodiment, a microprocessor 230 generates a pulse excitation signal through an amplifier 202 and a matched resistor array 204 whose outputs are provided to an accelerometer proof mass 210. A differential amplifier 212 is connected to the proof mass 210 and the matched resistors 204, and the output of the differential amplifier 212 is provided to a synchronous demodulator 214 whose output are is connected to a buffer 216. The buffer drives a loop compensation unit 218, which in turn is connected to a driver 220. The output of the driver 220 is connected to a feedback drive coil 222 to generate an accelerometer analog signal output. An analog to digital converter (ADC) 226 is connected to the accelerometer analog signal and sense resistor 224. The processor 230 receives the output of the ADC 226. The processor 230 can also drive a DAC 232 to provide temperature calibrated analog output, and the processor 230 reads from a temperature calibration memory 234. In one exemplary embodiment, the processor 210 can store the following sensor constants in memory:

| Memory Constant | Description of Constant |
| --- | --- |
| 16 | Accelerometer offset correction (MilliGees * 10) at −25 C., Default 0 |
| 17 | Accelerometer offset correction (MilliGees * 10) 0 C., default 0 |
| 18 | Accelerometer offset correction (MilliGees * 10) 25 C., default 0 |
| 19 | Accelerometer offset correction (MilliGees * 10) 50 C., default 0 |
| 20 | Accelerometer offset correction (MilliGees * 10) 75 C., default 0 |
| 21 | Accelerometer offset correction (MilliGees * 10) 100 C., default 0 |
| 22 | Accelerometer offset correction (MilliGees * 10) 125 C., default 0 |
| 23 | Accelerometer offset correction (MilliGees * 10) 150 C., default 0 |
| 24 | Accelerometer offset correction (MilliGees * 10) 175 C., default 0 |
| 25 | Accelerometer scale factor(V/Gee) @−25 C., default 1,000 |
| 26 | Accelerometer scale factor (V/Gee) @0 C., default 1,000 |
| 27 | Accelerometer scale factor) V/Gee) @25 C., default 1,000 |
| 28 | Accelerometer scale factor (V/Gee) @50 C., default 1,000 |
| 29 | Accelerometer scale factor (V/Gee) @75 C., default 1,000 |
| 30 | Accelerometer scale factor (V/Gee) @100 C., default 1,000 |
| 31 | Accelerometer scale factor (V/Gee) @125 C., default 1,000 |
| 32 | Accelerometer scale factor (V/Gee) @150 C., default 1,000 |
| 33 | Accelerometer scale factor (V/Gee) @175 C., default 1,000 |

The temperature compensated controller 102 enables the scale and offset calibration data to be measured at the factory and stored in the TBA internal memory. By adding an internal microprocessor and an analog to digital converter to the TBA electronics, the system can temperature-correct the accelerometer digital data output before transmission of the data. In addition by including a digital to analog converter to the system electronics it is possible to output an analog voltage proportional to acceleration that is temperature calibrated.

The process of temperature calibration of the TBA is lengthy in that it involves cooling and heating the system to various set temperatures e.g. −25, 0, 25, 50, 75, 100, 125, 150, 175 degrees Celsius and measuring the scale factor and offset at each temperature. By performing this process at the factory and downloading the calibration data to the TBA memory instead of temperature calibrating the TBA after it is installed in an external system, considerable time is saved by the user of the TBA. In addition performing an external calibration of the TBA requires considerable equipment and expertise. Internal calibration performed at the factory hence removes the burden of the difficult and time consuming calibration process from the TBA user.

Figure 4:
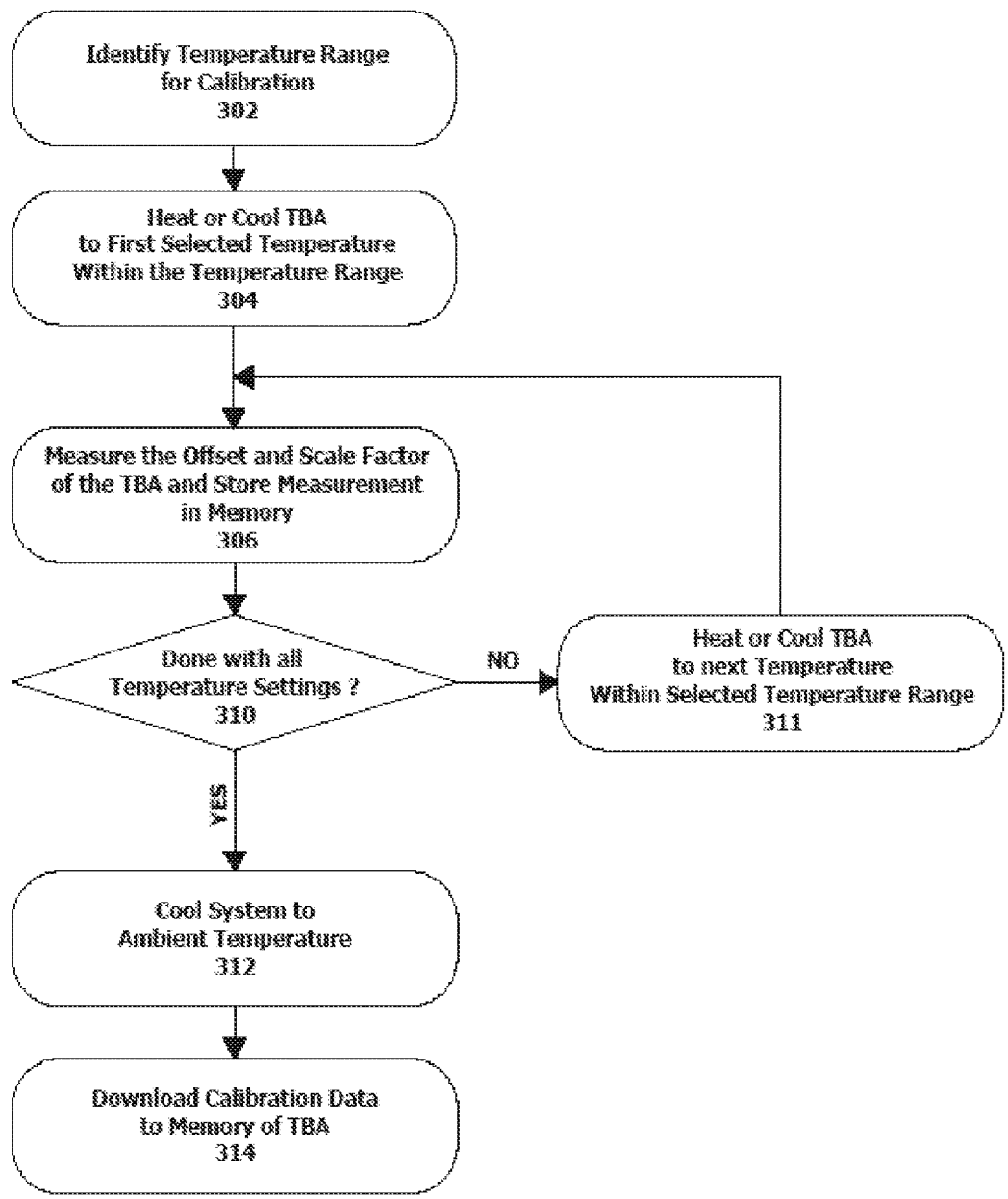
FIG. 4 shows an exemplary factory calibration process.

FIG. 4 shows an exemplary factory calibration methodology. In this process, a plurality of TBAs are put into a temperature controlled chamber system and the chamber performs cooling and heating the system to various set temperatures e.g. −25, 0, 25, 50, 75, 100, 125, 150, and 175 degrees Celsius. The TBAs are interrogated and the factory system determines the scale factor and offset at each temperature for each TBA. Thus, in FIG. 4, the temperature range is specified in 302, and the chamber heats the TBAs to the first desired temperature in 304. The TBAs are queried and the factory system determines the scale factor and offset for each TBA in 305; the measured data is saved in the factory system memory. The factory system checks to determine if all specified temperatures in the range in 310 have been selected and if this is true initiates a cool down to ambient temperature. If all temperatures have not been selected the factory system heats or cools the TBAs to the next temperature in 311 and proceeds to measure the scale and offset data when the specified temperature is met. When all temperature measurements have been done, and the TBAs have been cooled to ambient temperature, the calibration data is stored in the memory of each TBA in 312. By performing this process at the factory and downloading the calibration data to the TBA memory, the user needs not perform the temperature calibration in the field.

Figure 5:
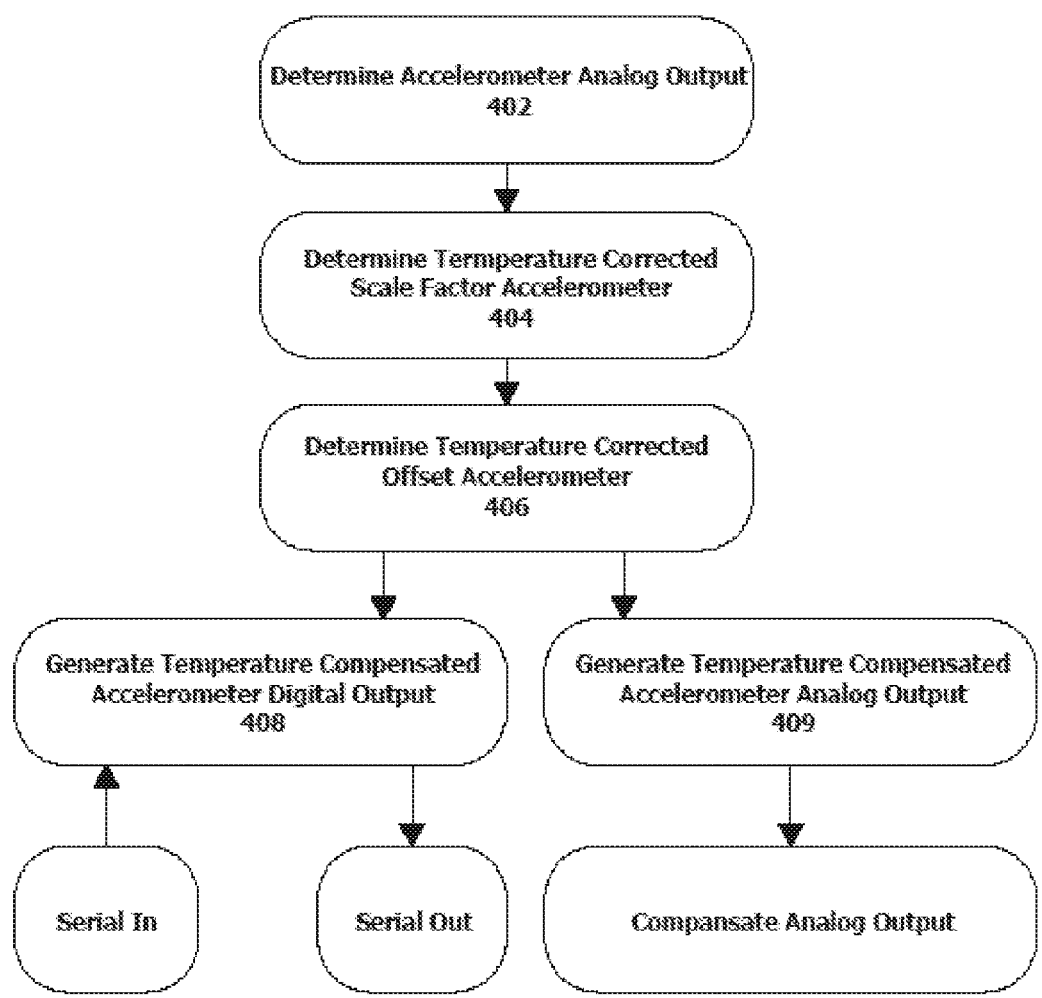
FIG. 5 shows an exemplary real-time temperature correction process done by the TBA.

FIG. 5 shows an exemplary temperature calibration methodology. In this process, the TBA electronics system (ES) determines the accelerometer output in 402. Next, the ES determines a temperature corrected scale factor (e.g. by the use of a look up table and linear interpolation) in 404. The ES then determines a temperature corrected offset (e.g. by use of a look up table and linear interpolation) in 406. Finally the ES generates both a temperature compensated digital output in 408 a temperature compensated analog output in 409.

In one illustrative example, the accelerometer analog output voltage is adjusted nominally to be (@25 C) 1V=1 Gee, and for the A to D converter, 2.5V=32,768 Counts. Therefore 1.000V=13,107 counts The scale factors for temperatures ranging from −25 C to +150 C are determined during the calibration process and stored in constants 25-33.

To determine the temperature corrected scale factor linear interpolation using constants 25-33 is used. These constants are encoded as 1,000*actual scale constant.

The values of the offset constants 16 to 24 are also determined during the temperature calibration process. To determine the temperature corrected offset, linear interpolation using constants 16-24 is used. Offset constants are encoded as 10 times the actual offset value in milligees.

Temperature Calibration Example:
Temperature=110 C
A to D counts per volt=16,000 Counts/Volt
Scale correction constant for 75 C, (constant 30) 1,002/1000=1.002 V/Gee Scale
correction constant for 125 C, (constant 31) 1,007/1000=1.007 V/Gee
Offset correction constant for 100 C constant 21/10=0.003
Offset correction constant for 125 C constant 22/10=0.001
Uncorrected A to D
reading AD=10,450 counts
Convert counts to volts V=10,450/16000=0.6531 volts
Convert volts to gees (Linear interpolation)

$GT=V*/$(Scale correction constant 31/1000)+(Scale correction constant 31−scale correction constant 30)/1000)*(current temp−low base temp)/Temp bin width)

$GT=0.6531/(1.002+(1.007−1.002)*(110−100)/25)$ $GT=0.6531/1.005=0.6498$ Gee

The scale factors always increase smoothly with increasing temperature because the system torquing magnet field strength decreases with increasing temperature.

Offset (OS) determination (linear interpolation)

$OS=$(constant 21)+((current temp−constant 21 Temp)/Temp bin width)*(constant 22−constant 21)

$OS=0.003+((110−100)/25)*(0.001−0.003)$ $OS=0.0022$

Temperature corrected scale and offset output, GTO $GTO=G-OS=0.6498-0.0022=0.6476$ Gee Thus, by adding an internal microprocessor and an analog to digital converter to the TBA electronics, the system can perform temperature correct the accelerometer digital data output before transmission of the data. In addition by including a digital to analog converter to the system electronics one embodiment can output an analog voltage proportional to acceleration that is temperature calibrated. By performing this process at the factory and downloading the calibration data to the TBA memory instead of temperature calibrating the TBA after it is installed in an external system, considerable time is saved by the user of the TBA. In addition performing an external calibration of the TBA requires considerable equipment and expertise. Internal calibration performed at the factory hence removes the burden of the difficult and time consuming calibration process from the TBA user.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A method for internally generating temperature compensated acceleration analog and digital output data comprising:
   performing factory calibration of a torque balance accelerometer (TBA), wherein for each a plurality of temperature ranges, cooling and heating the TBA to a temperature, collecting scale and offset correction factors at the temperature and storing the scale and offset correction factors in a memory of the TBA;
   ablating a second side of one or more flexure arms to detect acceleration;
   during field operation, sensing a current temperature, retrieving the scale and offset correction factors associated with the current temperature from the memory of the TBA, and performing linear interpolation to generate temperature-compensated analog and digital data outputs for the TBA.

2. The method of claim 1, comprising:
   receiving an analog output from the TBA;
   reading scale and offset correction factors from two calibrated temperatures one above and one below the current temperature;
   determining an adjusted scale and offset correction factor for the current temperature.

3. The method of claim 2, wherein the determining an adjusted scale and offset correction factor comprises linearly interpolating the factors.

4. The method of claim 1, comprising generating as an output a temperature calibrated analog voltage proportional to an acceleration.

5. The method of claim 1, wherein the TBA includes a flapper whose movement correlates with acceleration, comprising laser trimming the flapper.

6. The method of claim 5, comprising:
   forming a flapper hingedly supported by a bifilar flexure that extends radially inwardly from a support ring, wherein the bifilar flexure comprises a pair of flexure arms spaced apart by an opening or window;
   scanning a femtosecond laser on the flexure arms over a plurality of passes to gradually thin the bifilar flexure regions; and
   periodically reducing femtosecond laser output to minimize damage from laser scanning and maximize bifilar flexure strength until the bifilar flexure reaches a predetermined thickness.

7. The method of claim 6, comprising ablating the other side of the flexure arms.

8. The method of claim 1, wherein the memory stores a sensor address, comprising monitoring and responding to commands sent over a serial interface relating to acceleration associated with the sensor address.

9. The method of claim 8, comprising instructing all TBAs to acquire and store data for subsequent transmission.

10. A temperature compensated accelerometer, comprising:
    a torque balance accelerometer (TBA);
    a temperature sensor;
    a processor coupled to the TBA and the sensor; and
    code for generating temperature compensated acceleration monitoring of downhole drilling, including code for:
       performing factory calibration of a torque balance accelerometer (TBA), wherein for each a plurality of temperature ranges, cooling and heating the TBA to a temperature, collecting scale and offset correction factors at the temperature and storing the scale and offset correction factors in a memory of the TBA;
       during field operation, sensing a current temperature, retrieving the scale and offset correction factors associated with the current temperature from the memory of the TBA, and performing linear interpolation to generate a temperature-compensated output for the TBA wherein a laser ablates a second side of one or more flexure arms to detect acceleration.

11. The accelerometer of claim 10, comprising:
    receiving an analog output from the TBA;
    adjusting the analog output as counts per volt;
    reading scale and offset correction factors from two calibrated temperature above and below the current temperature;
    determining an adjusted scale and offset correction factor for the current temperature.

12. The accelerometer of claim 11, wherein the code for determining an adjusted scale and offset correction factor performs linearly interpolation of the factors.

13. The accelerometer of claim 12, comprising code for generating as an output a temperature calibrated analog voltage proportional to an acceleration.

14. The accelerometer of claim 12, wherein the TBA includes a flapper whose movement correlates with acceleration, comprising laser trimming the flapper.

15. The accelerometer of claim 14, comprising a flapper hingedly supported by a bifilar flexure that extends radially inwardly from a support ring, wherein the bifilar flexure comprises a pair of flexure arms spaced apart by an opening or window, wherein a femtosecond laser is scanned on the flexure arms over a plurality of passes to gradually thin the bifilar flexure regions and periodically femtosecond laser output is reduced to minimize damage from laser scanning and maximize bifilar flexure strength until the bifilar flexure reaches a predetermined thickness.

16. The system of claim 15, wherein the laser ablates the other side of the flexure arms.

17. The accelerometer of claim 10, wherein the memory stores a sensor address, comprising code for monitoring and responding to commands sent over a serial interface relating to acceleration associated with the sensor address.

18. The accelerometer of claim 17, comprising a remote computer instructing all TBAs to acquire and store data for subsequent transmission.

* * * * *